United States Patent [19]

Nakai et al.

[11] Patent Number: 4,604,416

[45] Date of Patent: Aug. 5, 1986

[54] METHACRYLIC RESIN COMPOSITION

[75] Inventors: Yoshio Nakai, Iwakuni; Katsusuke Yamauchi, Yamato; Masaaki Kishimura, Iwakuni; Masamitsu Tateyama, Yamaguchi, all of Japan

[73] Assignee: Mitsubishi Rayon Company Ltd., Tokyo, Japan

[21] Appl. No.: 681,125

[22] Filed: Dec. 13, 1984

[30] Foreign Application Priority Data

Dec. 13, 1983 [JP] Japan ................................ 58-233704
Jun. 2, 1984 [JP] Japan ................................ 59-112222

[51] Int. Cl.$^4$ ........................ C08K 5/06; C08K 5/52; C08L 33/12
[52] U.S. Cl. ........................ 524/145; 260/DIG. 15; 260/DIG. 16; 260/DIG. 19; 524/366; 524/376; 524/377
[58] Field of Search ............... 524/145, 366, 376, 377; 260/DIG. 15, DIG. 16, DIG. 19

[56] References Cited

U.S. PATENT DOCUMENTS

| | | | |
|---|---|---|---|
| 2,702,257 | 2/1955 | Harmon | 260/DIG. 15 |
| 2,710,402 | 6/1955 | Rowe | 260/DIG. 16 |
| 2,978,440 | 4/1961 | Frissell et al. | 260/DIG. 15 |
| 3,400,116 | 9/1968 | Boeke | 260/DIG. 19 |
| 3,835,148 | 9/1974 | Oxe et al. | 260/DIG. 19 |
| 3,879,346 | 4/1975 | Friedrich et al. | 260/DIG. 15 |
| 3,975,325 | 8/1976 | Long | 260/DIG. 16 |
| 4,139,691 | 2/1979 | Nakai et al. | 526/195 |
| 4,296,214 | 10/1981 | Kamada et al. | 526/193 |
| 4,433,103 | 2/1984 | Kamata et al. | 525/81 |

FOREIGN PATENT DOCUMENTS

| | | | |
|---|---|---|---|
| 739488 | 3/1970 | Belgium | 260/DIG. 19 |
| 54-69154 | 6/1979 | Japan | 260/DIG. 19 |
| 56-4637 | 1/1981 | Japan | 260/DIG. 19 |

Primary Examiner—Ronald W. Griffin
Attorney, Agent, or Firm—Oblon, Fisher, Spivak, McClelland & Maier

[57] ABSTRACT

A methacrylic resin composition having excellent impact resistance and antistatic property is described. This composition comprises (I) 50–99.8 wt. % of a methacrylic resin comprised of 80–100 wt. % of methyl methacrylate units and 0–20 wt. % of other copolymerizable monomer units, (II) 0.1–40 wt. % of a rubbery component which is a polymer containing an elastomeric portion comprising at least 50 wt. % of 1,3-butadiene and/or acrylic acid ester units, and (III) 0.1–10 wt. % of a specified compound.

12 Claims, No Drawings

METHACRYLIC RESIN COMPOSITION

BACKGROUND OF THE INVENTION (1) Field of the Invention

This invention relates to a methacrylic resin composition having excellent impact resistance and antistatic property.

(2) Description of the Related Art

Methacrylic resins have heretofore been used for parts of illuminated advertising articles and the exterior parts of vehicles and the like wherein the inherent excellent properties of methacrylic resins, such as high transparency, good weatherability, easy processability, and high heat resistance, are utilized.

In these fields of application, however, there is a demand for the elimination of the defects of methacrylic resins such as cracking due to insufficient impact resistance and the accumulation of a covering of dust and the like caused by electrostaticity.

A methacrylic resin composition in which the foregoing defects are eliminated and the inherent properties of methacrylic resins are retained has not been proposed up to now.

SUMMARY OF THE INVENTION

It is a primary object of the present invention to provide a methacrylic resin composition in which the impact resistance and antistatic property are improved and the inherent properties of methacrylic resins are not degraded.

In accordance with the present invention, there is provided a methacrylic resin composition comprising:

(I) 50 to 99.8% by weight, based on the total weight of the methacrylic resin compostion, of a methacrylic resin comprising 80% to 100% by weight of methyl methacrylate units and 20% to 0% by weight of units of another monomer copolymerizable with methyl methacrylate.

(II) 0.1 to 40% by weight, based on the total weight of the methacrylic resin composition, of a rubbery component which is a multi-stage, sequentially produced polymer containing an elastomeric portion comprising at least 50% by weight of units of a monomer selected from the group consisting of 1,3-butadiene and an acrylic acid ester, and (III) 0.1 to 10% by weight, based on the total weight of the methacrylic resin composition, of at least one compound selected from the group consisting of compounds represented by the following formulae (A) through (H):

$$\begin{array}{l} CH_2-OR \\ | \\ CH-OR_1, \\ | \\ CH_2-OR_2 \end{array} \quad (A)$$

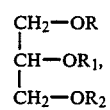  (B)

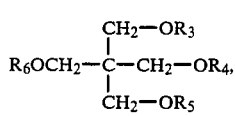  (C)

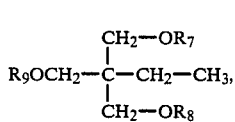

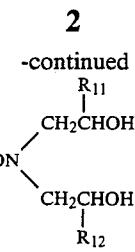  (D)

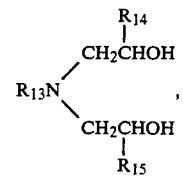  (E)

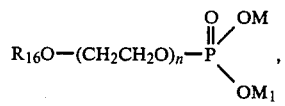  (F)

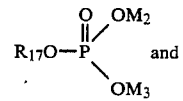  (G)

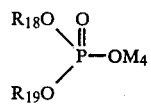  (H)

wherein R, $R_1$, $R_2$, $R_3$, $R_4$, $R_5$, $R_6$, $R_7$, $R_8$, and $R_9$ independently represent hydrogen of an acyl group having 8 to 20 carbon atoms; $R_{16}$, $R_{17}$, $R_{18}$, and $R_{19}$ independently represent an alkyl group having 8 to 20 carbon atoms; $R_{10}$, $R_{11}$, $R_{12}$, $R_{13}$, $R_{14}$, and $R_{15}$ independently represent an alkyl group having 1 to 18 carbon atoms; M, $M_1$, $M_2$, $M_3$, and $M_4$ independently represent hydrogen, Na, K or Li; and n is a number of from 1 to 50.

DESCRIPTION OF THE PREFERRED EMBODIMENTS

The methacrylic resin (I) used in the present invention is a homopolymer of methyl methacrylate or a copolymer comprising at least 80% by weight of methyl methacrylate units and up to 20% by weight of units of another monomer copolymerizable with methyl methacrylate. If the content of other copolymerizable monomer units exceeds 20% by weight, the heat resistance, water resistance, and mechanical properties, such as the tensile strength of the methacrylic resin (I) are degraded. As the monomer copolymerizable with methyl methacrylate, there can be mentioned alkyl methacrylates such as ethyl methacrylate, butyl methacrylate, and 2-ethyhexyl methacrylate; alkyl acrylates such as methyl acrylate, ethyl acrylate, butyl acrylate, and 2-ethylhexyl acrylate, and styrene, acrylonitrile, methacrylic acid, acrylic acid, itaconic acid, maleic acid, fumaric acid, and vinyltoluene. Of these, an alkyl acrylate such as methyl acrylate and styrene are preferred.

The rubbery component (II) is a multi-stage, sequentially produced polymer containing an elastomeric portion comprising at least 50% by weight of units of 1,3-butadiene and/or an acrylic acid ester. This polymer is prepared by a multi-stage polymerization wherein at least one stage for the formation of the elastomeric portion is included. The rubbery component (II) cooperates with the compound (III) to improve the impact resistance and antistatic property of the methacrylic resin (I).

As the acrylic acid ester used for the preparation of the rubbery component (II), an alkyl acrylate is preferably used, the alkyl group of which is unsubstituted or substituted and has 1 to 8 carbon atoms. More preferably ethyl acrylate, butyl acrylate, 2-ethylhexyl acrylate, and benzyl acrylate are used.

The elastomeric portion in the rubbery component (II) is comprised of units of 1,3-butadiene and/or acrylic acid ester, or of at least 50% by weight of units of 1,3-butadiene and/or an acrylic acid ester plus not more than 50% by weight of units of another copolymerizable monomer. This elastomeric portion has a crosslinked structure. As the other copolymerizable monomer, there are preferably used alkyl esters of methacrylic acid such as methyl methacrylate, butyl methacrylate, and cyclohexyl methacrylate, and styrene and acrylonitrile. The crosslinking agent used is not particularly critical. However, preferably used are ethylene glycol dimethacrylate, 1,3-butylene glycol dimethacrylate, 1,4-butanediol diacrylate, allyl acrylate, allyl methacrylate, diallyl phthalate, triallyl cyanurate, triallyl isocyanurate, and divinylbenzene. These crosslinking agents may be used singly or in the form of a mixture of two or more of them.

The structure of the rubbery component (II) is not particularly critical, so far as the rubbery component (II) has elastomeric properties. For example, a rubbery component containing a hard resin in the interior of an elastomer, a rubbery component containing multiple stages of elastomers, and a rubbery component comprising an elastomer having an outer portion coated with multiple stage of hard resins may be used together with the compound (III) for imparting a good antistatic property.

Typical examples of the rubbery component (II) will be explained.

The first type rubbery component (II) is a multistage, sequentially produced polymer prepared by two stage polymerization. This polymer comprises (i) an elastomer phase formed in the first polymerization stage, comprised of at least 50% by weight of units of an alkyl acrylate (the alkyl group being unsubstituted or substituted and having 1 to 8 carbon atoms) and having a glass transition temperature not higher than 25° C., and (ii) a hard resin phase formed in the second polymerization stage in the presence of the product obtained in the first polymerization stage, comprised of 80 to 100% by weight of units of methyl methacrylate and having a glass transition temperature of at least 25° C. The first type rubbery component (II) is described in, for example, Japanese Patent Publication No. 54-18298.

The second type rubbery component (II) is a multistage, sequentially produced polymer prepared by three or more stage polymerization. This polymer comprises (i) an elastomeric phase formed in the first polymerization stage, comprised of units of at least 50% by weight of an alkyl acrylate (the alkyl group being unsubstituted or substituted and having 1 to 8 carbon atoms) and having a glass transition temperature not higher than 25° C., (ii) a hard resin phase formed in the final polymerization stage, comprised of 80 to 100% by weight of units of methyl methacrylate and having a glass transition temperature of at least 25° C., and (iii) one or more intermediate phases formed in the intermediate polymerization stage or stages, each phase being comprised of units of an alkyl acrylate (the alkyl group being unsubstituted or substituted and having 1 to 8 carbon atoms) and units of methyl methacrylate and having a glass transition temperature between those of the first elastomeric phase and the final hard resin phase. Each of the intermediate polymerization stage or stages and the final polymerization stage is effected in the presence of the product obtained in the previous polymerization stage.

The third type rubbery component (II) is a multistage, sequentially produced polymer prepared by three stage polymerization. This polymer comprises (i) an elastomer phase formed in the first polymerization stage, comprised of at least 50% by weight of units of an alkyl acrylate (the alkyl group being unsubstituted or substituted and having 1 to 8 carbon atoms) and having a glass transition temperature not higher than 25° C., (ii) a hard resin phase formed in the second polymerization stage in the presence of the product obtained in the first polymerization stage, comprised of 80 to 100% by weight of units of methyl methacrylate and having a glass transition temperature of at least 25° C., and (iii) an elastomer phase formed in the third polymerization stage in the presence of the product obtained in the second polymerization stage, comprised of at least 50% by weight of units of an alkyl acrylate (the alkyl group being unsubstituted or substituted and having 1 to 8 carbon atoms), and having a glass transition temperature not higher than 25° C.

The fourth type rubber component (II) is a multistage, sequentially produced polymer which is prepared by three stage polymerization and comprises (i) an elastomer phase formed in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., (ii) a hard resin phase formed in the second polymerization stage in the presence of the product obtained in the first polymerization stage, comprised of 80 to 100% by weight of units of methyl methacrylate and having a glass transition temperature of at least 25° C., (iii) an elastomer phase formed in the third polymerization stage in the presence of the product obtained in the second polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., and (iv) a hard resin phase formed in the fourth polymerization stage in the presence of the product obtained in the third polymerization stage, comprised of 80 to 100% by weight of units of methyl methacrylate and having a glass transition temperature of at least 25° C.

The fifth type rubbery component (II) is a multistage, sequentially produced polymer prepared by three stage polymerization. This polymer comprises (i) a hard resin phase formed in the first polymerization stage, comprised of 80 to 100% by weight of units of methyl methacrylate and having a glass transition temperature of at least 25° C., (ii) an elastomer phase formed in the second polymerization stage in the presence of the product obtained in the first polymerization stage, comprised of at least 50% by weight of units of an alkyl acrylate (the alkyl group being unsubstituted or substituted and having 1 to 8 carbon atoms) and having a glass transition temperature not higher than 25° C., and (iii) a hard resin phase formed in the third polymerization stage in the presence of the product obtained in the second polymerization stage, comprised of 80 to 100% by weight of units of methyl methacrylate and having a glass transition temperature of at least 25° C. The fourth type rubbery component is described in, for example, U.S. Pat. No. 4,433,103.

The sixth type rubbery component is a multi-stage, sequentially produced polymer prepared by five or more stage polymerization. This polymer comprises (i) a hard resin phase formed in the first polymerization stage, comprised of 80 to 100% by weight of units of methyl methacrylate and having a glass transition temperature of at least 25° C., (ii) an elastomer phase formed in an intermediate polymerization stage, comprised of at least 50% by weight of units of an alkyl acrylate (the alkyl group being unsubstituted or substituted and having 1 to 8 carbon atoms) and having a glass transition temperature not higher than 25° C., and (iii) a hard resin phase formed in the final polymerization stage, comprised of 80 to 100% by weight of methyl methacrylate and having a glass transition temperature of at least 25° C., (iv) one or more intermediate phases formed in the intermediate polymerization stage or stages between the first polymerization stage and the polymerization stage for the formation of the elastomer phase (ii), each intermediate phase being comprised of units of an alkyl acrylate (the alkyl group being unsubstituted or substituted and having 1 to 8 carbon atoms) and units of methyl methacrylate and having a glass transition temperature between those of the hard resin phase (i) and the elastomer phase (ii), and (v) one or more intermediate phases formed in the intermediate polymerization stage or stages between the polymerization stage for the formation of the elastomer phase (ii) and the final polymerization stage, each intermediate phase being comprised of units of an alkyl acrylate (the alkyl group being unsubstituted or substituted and having 1 to 8 carbon atoms) and units of methyl methacrylate and having a glass transition temperature between those of the elastomer phase (ii) and the hard resin phase (iii). Each of the intermediate polymerization stage or stages between the first polymerization stage and the polymerization stage for the formation of the elastomer phase (ii); the polymerization stage for the formation of the elastomer phase (ii); the intermediate polymerization stage or stages between the polymerization stage for the formation of the elastomer phase (ii) and the final polymerization stage; and the final polymerization stage, being effected in the presence of the product obtained in the previous polymerization stage. The fifth type rubbery component is described in, for example, U.S. Pat. No. 4,054,525.

The seventh type rubbery component is a multi-stage, sequentially produced polymer prepared by four stage polymerization. This polymer comprises (i) a hard resin phase formed in the first polymerization stage, comprised of 80 to 100% by weight of units of methyl methacrylate and having a glass transition temperature of at least 25° C., (ii) an elastomer phase formed in the second polymerization stage in the presence of the product obtained in the first polymerization stage, comprised of at least 50% by weight of units of an alkyl acrylate (the alkyl group being unsubstituted or substituted and having 1 to 8 carbon atoms) and having a glass transition temperature not higher than 25° C., (iii) a hard resin phase formed in the third polymerization stage in the presence of the product obtained in the second polymerization stage, comprised of 80 to 100% by weight of units of methyl methacrylate and having a glass transition temperature of at least 25° C., and (iv) an elastomer phase formed in the fourth polymerization stage in the presence of the product obtained in the third polymerization stage, comprised of at least 50% by weight of units of an alkyl acrylate (the alkyl group being unsubstituted or substituted and having 1 to 8 carbon atoms) and having a glass transition temperature not higher than 25° C. The sixth type rubbery component is described in, for example, Japanese Unexamined Patent Publication No. 59-124947 and No. 59-124948.

The eighth type rubbery component is a graft polymer prepared by two stage polymerization. This graft polymer comprises (i) an elastomer phase formed from a monomer mixture comprised of 1 to 95% by weight of 1,3-butadiene, 5 to 99% by weight of an alkyl acrylate (the alkyl group being unsubstituted or substituted and having (1 to 8 carbon atoms) and 0 to 20% by weight of at least one other copolymerizable monofunctional or polyfunctional monomer, and (ii) a hard resin phase formed by polymerizing in the presence of the elastomer phase (i) a monomer or monomer mixture comprised of 80 to 100% by weight of methyl methacrylate and 0 to 20% by weight of at least one other copolymerizable monomer, the amount of the hard resin phase (ii) being 10 to 1000 parts by weight per 100 parts by weight of the elastomer phase (i).

The rubbery component (II) is incorporated in an amount of 0.1 to 40% by weight, preferably 0.5 to 35% by weight, based on the total methacrylic resin composition. If the amount of the rubbery component (II) is larger than 40% by weight, the heat resistance is low. In contrast, if the amount of the rubbery component (II) is smaller than 0.1% by weight, manifestation of the impact resistance and antistatic property is insufficient.

The component (III) used in the present invention is 0.1 to 10% by weight of at least one compound selected from the group consisting of compounds represented by the following formulae (A) through (H):

(A)

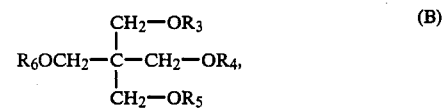

(B)

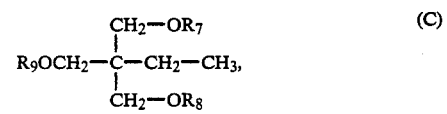

(C)

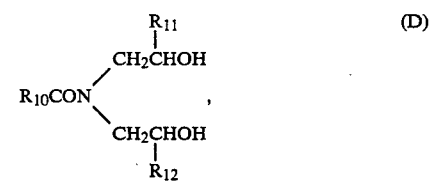

(D)

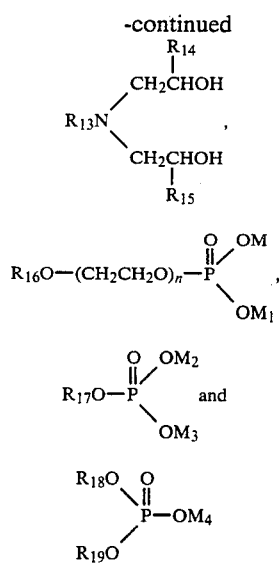

wherein R, $R_1$, $R_2$, $R_3$, $R_4$, $R_5$, $R_6$, $R_7$, $R_8$, and $R_9$, which may be the same or different, represent hydrogen or an acyl group having 8 to 20 carbon atoms; $R_{16}$, $R_{17}$, $R_{18}$, and $R_{19}$, which may be the same or different, represent an alkyl group having 8 to 20 carbon atoms; $R_{10}$, $R_{11}$, $R_{12}$, $R_{13}$, $R_{14}$, and $R_{15}$, which may be the same or different, represent an alkyl group having 1 to 18 carbon atoms; M, $M_1$, $M_2$, $M_3$, and $M_4$, which may be the same or different, stand for hydrogen, Na, K or Li; and n is a number of from 1 to 50.

When compounds other than the above-mentioned compounds (III) are used, it is difficult to maintain the inherent properties of the methacrylic resin.

The amount of the compound (III) added is 0.1 to 10% by weight, preferably 0.3 to 7% by weight, based on the total methacrylic resin composition. If the amount of the compound (III) is outside the above-mentioned range, the surface of a final product of the methacrylic resin composition becomes sticky or the antistatic effect is not manifested.

The process for the preparation of the methacrylic resin (I) used in the present invention is not particularly critical, but bulk polymerization or suspension polymerization is preferred. Furthermore, the process for the preparation of the rubbery component (II) used in the present invention is not particularly critical, but the emulsion polymerization process is preferred.

An embodiment of the emulsion polymerization process for the preparation of the rubbery component (II) will now be described.

A reaction vessel is charged with deionized water and, if necessary, an emulsifier, and then a monomer mixture having the composition corresponding to a copolymer containing at least 50% by weight of a cross-linked acrylic acid ester copolymer and/or a cross-linked diene-alkyl acrylate copolymer. The monomer mixture may be polymerized either in a single stage or a plurality of stages.

The polymerization temperature is 30° C. to 120° C., preferably 50° C. to 100° C. The polymerization time is varied according to the kinds and amount of the polymerization initiator and emulsifier, the number of polymerization stages, and the polymerization temperature, but ordinarily, the polymerization time is 0.5 to 20 hours.

The monomer/water weight ratio is preferably in the range of from 1/20 to 1/1. The polymerization initiator and emulsifier may be added to either or both of the water phase and the monomer phase.

In the polymerization process, the monomers may be charged in the reactor collectively or dividedly. In principle, the divided charging method is preferred, although the charging method differs to some extent according to the number of polymerization stages.

Customary emulsifiers can be used without any limitation. For example, there can be used long-alkyl carboxylate salts, salts of alkyl esters of sulfosuccinic acid, and alkylbenzenesulfonate salts.

The kind of polymerization initiator used is not particularly critical. Customary inorganic initiators such as water-soluble persulfates and perborates may be used either alone or in combination with sulfites as redox type initiators. Moreover, there may be used redox type initiators such as organic peroxide-sodium formaldehyde sulfoxylate, and organic initiators such as benzoyl peroxide, and azobisisobutyronitrile.

The crosslinked acrylic acid ester copolymer obtained according to the emulsion polymerization method may be coagulated and dried according to customary procedures.

For the incorporation of the rubbery component (II) and the compound (III) in the methacrylic resin (I), adoption of the melt-mixing method is most preferred. Prior to the melt-mixing operation, appropriate amounts of a stabilizer, a lubricant, a plasticizer, a dye, a pigment, and a filler are added to the resin composition according to need, and the mixture is then melt-kneaded at 150° C. to 300° C. by using a V-blender, a Henschel mixer, a mixing roll, or a screw type extruder.

The methacrylic resin composition of the present invention can be shaped into various shaped articles possessing excellent impact resistance and antistatic property by using, for example, an extruder or injection molding machine.

As is apparent from the foregoing description, according to the present invention, the rubbery component (II) co-operates with the compound (III) to improve the impact resistance and antistatic property of the methacrylic resin (I). Where the rubbery component (II) is not present, even if the compound (III) is incorporated into the methacrylic resin (I), the impact resistance cannot be enhanced and the antistatic property is very poor. The functional mechanism for attaining the above effect of the present invention has not been completely elucidated, but it is believed that in the presence of the rubbery component (II) having a glass transition temperature (Tg) lower than normal temperature, the movement of the compound (III) is facilitated in the composition. It is considered that this effect has a good influence on the dispersion state of the compound (III) in the composition and bleeding of the compound (III) to the surface of the composition. Here, it must be noted that the above-mentioned effect in the presence of the rubbery component (II) is manifested only by the specific compound (III) of the present invention.

The present invention will now be described in detail with reference to the following examples that by no means limit the scope of the invention. All of "parts" and "%" in the examples are by weight.

In the examples, characteristics of the molded articles were determined as follows.

(a) Gloss was determined according to ASTM D-673-44 at an incident angle of 60°.

(b) Haze was determined according to ASTM D-1003-52.

(c) Total luminous transmittance was determined according to ASTM D-1003-52.

(d) Izod impact strength was determined according to ASTM D-256-54T.

(e) The charge half-value period was measured at a temperature of 20° C. and a relative humidity of 50% by using an Honestmeter supplied by Shishido Shokai K.K.

(f) Surface resistivity was measured at a temperature of 20° C. and a relative humidity of 50% by using a super-insulating resistance meter supplied by Takeda-Riken K.K.

(g) Attachment of fly ash was examined as follows.

Cigarette ash was placed in a Petri dish. A molded article rubbed against a wool surface 50 times reciprocatively was located at a height of 50 cm and the state of attachment of tobacco ash to the molded article was observed.

EXAMPLE 1

A rubbery component (II) was prepared according to the following two-stage emulsion polymerization process. In the first stage, a monomer mixture comprising 80% of butyl acrylate, 19% of styrene, and 1% of allyl methacrylate was polymerized by emulsion polymerization. In the second stage, 60 parts of a monomer mixture comprising 99% of methyl methacrylate and 1% of methyl acrylate was polymerized by emulsion polymerization in the presence of 100 parts of the product obtained in the first stage. In a Henschel mixer, 5.7 kg of a methacrylic resin (I) obtained by suspension polymerization of a monomer mixture comprising methyl methacrylate and methyl acrylate at a weight ratio of 99/1 was mixed with 3.9 kg of the above-mentioned rubbery component (II) and 0.4 kg of glycerol monostearate as the compound (III). The mixture was extruded and pelletized at a cylinder temperature of 190° C. to 250° C. by using a biaxial extruder (Model PCM-30 supplied by Ikegai Tekko K.K.).

The pelletized composition was injection molded under the conditions described below and the molded article was tested to obtain the results shown in Table 1.

Injection molding machine:
Screw type automatic injection molding machine, Model V-17-65 supplied by Nippon Seikosho K.K.

Injection molding conditions:
Cylinder temperature of 250° C., mold temperature of 60° C., and injection pressure of 50 kg/cm² (gauge pressure)

Size of test piece:
110 mm × 110 mm × 2 mm (thickness) or 70 mm × 12.5 mm × 6.5 mm (thickness)

EXAMPLE 2

An injection-molded article was prepared in the same manner as described in Example 1 except that a rubbery component (II) obtained by the following three-stage emulsion polymerization process was used. In the first stage, 25 parts of a monomer mixture comprising methyl methacrylate, methyl acrylate and 1,3-butylene dimethacrylate at a weight ratio of 97/1/2 was polymerized by emulsion polymerization. In the second stage, 75 parts of a monomer mixture comprising butyl acrylate, styrene, allyl methacrylate and 1,3-butylene dimethacrylate at a weight ratio of 80/18/1.0/1.0 was polymerized by emulsion polymerization in the presence of the product obtained in the first stage. In the third stage, 60 parts of a monomer mixture comprising methyl methacrylate and methyl acrylate at a weight ratio of 99/1 was polymerized by emulsion polymerization in the presence of the product obtained in the second stage. The injection-molded article was tested in the same manner as described in Example 1. The results are shown in Table 2.

EXAMPLE 3

An injection-molded article was prepared in the same manner as described in Example 1 except that a rubbery component (II) obtained by the following five-stage emulsion polymerization process was used. In the first stage, 10 parts of a monomer mixture comprising methyl methacrylate and allyl methacrylate at a weight ratio of 99.5/0.5 was polymerized by emulsion polymerization. In the second stage, 15 parts of a monomer mixture comprising methyl methacrylate, butyl acrylate, styrene and allyl methacrylate at a weight ratio of 50/40/9.5/0.5 was polymerized by emulsion polymerization in the presence of the product obtained in the first stage. In the third stage, 50 parts of a monomer mixture comprising butyl acrylate, styrene and allyl methacrylate at a weight ratio of 80/19/1.0 was polymerized by emulsion polymerization in the presence of the product obtained in the second stage. In the fourth stage, 10 parts of a monomer mixture comprising methyl methacrylate, butyl acrylate, styrene and allyl methacrylate at a weight ratio of 50/40/9.5/0.5 was polymerized by emulsion polymerization in the presence of the product obtained in the third stage. In the fifth stage, 15 parts of a monomer mixture comprising methyl methacrylate and methyl acrylate at a weight ratio of 99/1 was polymerized by emulsion polymerization in the presence of the product obtained in the fourth stage. The injection-molded article was tested in the same manner as described in Example 1. The results are shown in Table 2.

TABLE 1

| | Gloss (%) | Haze (%) | Total Luminous Transmittance (%) | Izod Impact Strength (Kg-cm/cm) | Charge Half-Value Period (sec) | Surface Resistivity ($\Omega$) | Fly Ash Attachment | Surface Stickiness |
|---|---|---|---|---|---|---|---|---|
| Example 1 | 98.4 | 2.1 | 92.1 | 4.4 | 4.5 | $6.1 \times 10^9$ | Not attached | Not observed |
| Acrypet VH*[1] (Comparative example) | 100 | 0.9 | 93.2 | 1.3 | >120 | $1.6 \times 10^{14}$ | Attached | Not observed |

*[1] Molded article of an methyl methacrylate polymer resin "Acrypet VH" supplied by Mitsubishi Rayon Co.

EXAMPLE 4

An injection-molded article was prepared in the same manner as described in Example 1 except that a rubbery component (II) obtained by the following three-stage emulsion polymerization process was used. In the first stage, 90 parts of a monomer mixture comprising butyl acrylate, styrene and allyl methacrylate at a weight ratio of 80/19/1.0 was polymerized by emulsion polymerization. In the second stage, 60 parts of a monomer mixture comprising methyl methacrylate and methyl acrylate at a weight ratio of 99/1 was polymerized by emulsion polymerization in the presence of the product obtained in the first stage. In the third stage, 10 parts of a monomer mixture comprising butyl acrylate, styrene and allyl methacrylate at a weight ratio of 80/19/1.0 was polymerized by emulsion polymerization in the presence of the product obtained in the second stage. The injection-molded article was tested in the same manner as described in Example 1. The results are shown in Table 2.

EXAMPLE 5

An injection-molded article was prepared in the same manner as described in Example 1 except that a rubbery component (II) obtained by the following four-stage emulsion polymerization process was used. In the first stage, 20 parts of a monomer mixture comprising methyl methacrylate, methyl acrylate and 1,3-butylene dimethacrylate at a weight ratio of 98/1/1 was polymerized by emulsion polymerization. In the second stage, 80 parts of a monomer mixture comprising butyl acrylate, styrene, allyl methacrylate and 1,3-butylene dimethacrylate at a weight ratio of 80/18/1.0/1.0 was polymerized by emulsion polymerization in the presence of the product obtained in the first stage. In the third stage 10 parts of a monomer mixture comprising methyl methacrylate, methyl acrylate and 1,3-butylene dimethacrylate at a weight ratio of 98.5/1.0/0.5 was polymerized by emulsion polymerization in the presence of the product obtained in the second stage. In the fourth stage, 50 parts of a monomer mixture comprising methyl methacrylate and methyl acrylate at a weight ratio of 99/1 was polymerized by emulsion polymerization in the presence of the product obtained in the third stage. The injection-molded article was tested in the same manner as described in Example 1. The results are shown in Table 2.

TABLE 2

|  | Gloss (%) | Haze (%) | Total Luminous Transmittance (%) | Izod Impact Strength (Kg-cm/cm) | Charge Half-Value Period (sec) | Surface Resistivity ($\Omega$) | Fly Ash Attachment | Surface Stickiness |
|---|---|---|---|---|---|---|---|---|
| Example 2 | 98.3 | 1.9 | 92.3 | 3.9 | 3.6 | $3.4 \times 10^9$ | Not attached | Not observed |
| Example 3 | 98.4 | 2.0 | 92.2 | 3.7 | 4.0 | $2.8 \times 10^9$ | Not attached | Not observed |
| Example 4 | 98.1 | 1.8 | 92.4 | 4.0 | 4.1 | $1.7 \times 10^9$ | Not attached | Not observed |
| Example 5 | 98.5 | 2.1 | 92.2 | 4.4 | 4.2 | $1.9 \times 10^9$ | Not attached | Not observed |

EXAMPLES 6 THROUGH 14 AND COMPARATIVE EXAMPLES 1 THROUGH 4

Injection-molded articles were prepared in the same manner as described in Example 1 except that the amounts of the methacrylic resin (I) and rubbery component (II) and the amount and kind of the compound (III) were varied as indicated in Table 3. The injection-molded articles were tested in the same manner as described in Example 1. The results are shown in Table 3.

TABLE 3

|  | Amount (parts) of Methacrylic Resin (I) | Amount (parts) of Rubbery Component (II) | Compound (III) added | Amount of Compound (III) (parts) | Gloss (%) | Haze (%) |
|---|---|---|---|---|---|---|
| Example 6 | 42 | 55 | Glycerol monostearate | 3 | 97.3 | 2.4 |
| Example 7 | 79 | 16 | Glycerol monostearate | 5 | 99.0 | 1.4 |
| Example 8 | 57 | 38 | Trimethylolpropane monostearate | 5 | 98.3 | 2.0 |
| Example 9 | 57 | 38 | Pentaerythritol monostearate | 5 | 98.6 | 2.1 |
| Example 10 | 57 | 38 | N,N—di(2-hydroxypropyl)-dodecaneamide | 5 | 98.2 | 1.9 |
| Example 11 | 57 | 38 | N,N—di(2-hydroxypropyl)-dodecylamine | 5 | 98.1 | 2.3 |
| Example 12 | 57 | 38 | Disodium mono(3,6-dioxaoctadecyl)-phosphate | 5 | 98.0 | 2.4 |
| Example 13 | 57 | 38 | Disodium monooctadecyl phosphate | 5 | 98.3 | 2.1 |
| Example 14 | 57 | 38 | Sodium didodecyl phosphate | 5 | 98.2 | 1.8 |
| Comparative Example 1 | 97 | — | Trimethylolpropane distearate | 3 | 99.6 | 1.0 |
| Comparative Example 2 | 90 | 10 | — | — | 98.7 | 1.4 |
| Comparative Example 3 | 61.95 | 38 | Pentaerythritol distearate | 0.05 | 98.2 | 2.3 |
| Comparative | 47 | 38 | Pentaerythritol | 15 | 95.2 | 4.8 |

TABLE 3-continued

Example 4 monolaurate

|  | Total Luminous Transmittance (%) | Izod Impact Strength (kg-cm/cm) | Charge Half-Value Period (sec) | Surface Resistivity (Ω) | Fly Ash Attachment | Surface Stickiness |
|---|---|---|---|---|---|---|
| Example 6 | 92.0 | 5.8 | 4.7 | $2.1 \times 10^9$ | Not attached | Not observed |
| Example 7 | 92.5 | 3.1 | 4.0 | $1.1 \times 10^9$ | " | " |
| Example 8 | 92.4 | 4.1 | 3.5 | $2.4 \times 10^9$ | " | " |
| Example 9 | 92.2 | 4.0 | 2.8 | $1.6 \times 10^9$ | " | " |
| Example 10 | 92.4 | 4.3 | 1.6 | $5.1 \times 10^8$ | " | " |
| Example 11 | 91.8 | 4.2 | 1.5 | $3.2 \times 10^8$ | " | " |
| Example 12 | 91.8 | 4.1 | 4.7 | $7.2 \times 10^9$ | " | " |
| Example 13 | 92.1 | 4.1 | 3.6 | $4.6 \times 10^9$ | " | " |
| Example 14 | 92.4 | 4.3 | 5.0 | $1.2 \times 10^{10}$ | " | " |
| Comparative Example 1 | 93.1 | 1.3 | >120 | $1.5 \times 10^{12}$ | Considerably attached | " |
| Comparative Example 2 | 92.9 | 2.8 | >120 | $4.8 \times 10^{14}$ | " | " |
| Comparative Example 3 | 92.4 | 3.4 | >120 | $3.1 \times 10^{14}$ | " | " |
| Comparative Example 4 | 90.2 | 4.5 | Not charged | $1.1 \times 10^8$ | Not attached | Observed |

From the results shown in Table 3, it will readily be understood that if the rubbery component (II) is not added or the amount added of the compound (III) is outside the range specified in the present invention, the intended object cannot be attained.

EXAMPLE 15

Preparation of Rubbery Copolymer (M)
Butyl acrylate: 6 kg
1,3-Butadiene: 4 kg
Diisopropylbenzene dihydroperoxide: 20 g
Potassium beef tallow fatty acid: 100 g
Sodium N-lauroylsarcosinate: 50 g
Sodium pyrophosphate: 50 g
Ferrous sulfate: 0.5 g
Dextrose: 30 g
Deionized water: 20 kg Oxygen contained in all of the above components except 1,3-butadiene was substituted by nitrogen to produce a state wherein substantial polymerization reaction was not inhibited. Then, all the components were charged in a 40-liter autoclave and polymerization was carried out at 50° C. Polymerization was substantially completed within 9 hours, and a rubber latex having a particle size of 0.07 μm was obtained at a conversion of 97%.

Preparation of Latex of Rubbery Component (Graft Copolymer) (II)

The reaction vessel in which polymerization had been carried out and which was charged with the latex containing 10 kg of the solids of the rubbery polymer (M) was charged with 9 kg of deionized water, 20 g of sodium formaldehyde-sulfoxylate and 50 g of sodium N-lauroylsarcosinate, and the inner temperature was elevated to 75° C. Then, the following components were continuously added over a period of 90 minutes to effect polymerization.

Methyl methacrylate: 4320 g
    Ethyl acrylate: 180 g
    n-Octylmercaptan: 6.75 g
    Cumene hydroperoxide: 16 g After completion of the addition, polymerization was further conducted for 60 minutes. The conversion of methyl methacrylate was substantially 100%.

Then, 58 g of styrenated phenol, 44 g of dilaurylthiodipropionate, and 58 g of triphenyl phosphite were added to the obtained polymer latex. The mixture was coagulated at 50° C. with an aqueous 0.25% sulfuric acid so that the latex/water ratio was 1/2, and the mixture was maintained at 85° C. for 5 minutes.

The obtained slurry-like polymer was washed with water, dehydrated, and then dried at 65° C. for 36 hours to obtain a white powder.

In a Henschel mixer having a capacity of 20 liters, 2.9 kg of the rubbery component (II-1) in the form of the powdery resin was mixed with 7.1 kg of a methyl methacrylate polymer (Acrypet VH supplied by Mitsubishi Rayon Co.), 500 g of glycerol monostearate, 20 g of Tinuvin-P (ultraviolet absorber supplied by Ciba-Geigy) and 30 g of Sanol LS770 (ultraviolet absorber supplied by Sankyo K.K.). The mixture was pelletized at a temperature of 230° C. to 250° C. and a rotation number of 250 rpm by using a biaxial extruder having a diameter of 30 mm (Model PCM-30 supplied by Ikegai Tekko K.K.). The pelletized resin was injection-molded at a cylinder temperature of 250° C. and an injection pressure of 50 kg/cm² (gauge pressure) by using a screw type injection molding machine (Ankerwerk 7V-17-65 supplied by Nippon Seikosho K.K.) to obtain test pieces having a size of 110 mm × 110 mm × 2 mm (thickness) or 70 mm × 12.5 mm × 6.5 mm (thickness). These test pieces were tested to obtain results shown in Table 4.

From the results shown in Table 4, it will be readily understood that the composition of the present invention has a good transparency and an excellent impact resistance and antistatic property.

TABLE 4

|  | Example 15 |
|---|---|
| Gloss (%) | 98.4 |
| Haze (%) | 2.1 |
| Total Luminous Transmittance (%) | 92.1 |
| Izod Impact Strength (kg-cm/cm) | 6.5 |
| Charge Half-Value Period (sec) | 3.1 |
| Surface Resistivity (Ω) | $2.6 \times 10^9$ |
| Fly Ash Attachment | Not attached |
| Surface Stickiness | Not observed |

EXAMPLES 16 AND 17 AND COMPARATIVE EXAMPLES 5 THROUGH 7

An impact-resistant thermoplastic resin composition was prepared in the same manner as described in Example 15 except that the monomer components constituting the rubbery copolymer (M) were varied as indicated in Table 5. Test pieces were prepared and tested in the same manner as described in Example 15. The results are shown in Table 6.

TABLE 5

|  | Butyl Acrylate (kg) | 1,3-Butadiene (kg) | Styrene (kg) | 1,3-Butylene Dimethacrylate (g) | t-Dodecyl-Mercaptan (g) |
|---|---|---|---|---|---|
| Example 16 | 9 | 1 | — | 50 | — |
| Example 17 | 5.5 | 4.5 | — | — | 20 |
| Comparative Example 5 | — | 10 | — | — | — |
| Comparative Example 6 | — | 4.5 | 5.5 | — | — |
| Comparative Example 7 | 1.0 | — | — | 50 | — |

TABLE 6

|  | Example 16 | Example 17 | Comparative Example 5 | Comparative Example 6 | Comparative Example 7 |
|---|---|---|---|---|---|
| Haze (%) | 3.9 | 2.1 | 6.9 | 29 | 26 |
| Total Luminous Transmittance (%) | 90.4 | 92.2 | 85.0 | 42.1 | 60.5 |
| Izod Impact Strength (kg-cm/cm) | | | | | |
| 23° C. | 8.6 | 9.8 | 9.6 | 4.6 | 5.1 |
| −30° C. | 5.2 | 5.6 | 5.8 | 2.3 | 2.1 |
| After accelerated exposure test (1000 hours, 23° C.) | 8.1 | 7.0 | 3.9 | 3.5 | 4.1 |
| Change Half-Value Period (sec) | 3.5 | 3.8 | 4.0 | 4.6 | 4.5 |
| Surface Resistivity (Ω) | $2.8 \times 10^9$ | $2.1 \times 10^9$ | $1.8 \times 10^{10}$ | $4.9 \times 10^{90}$ | $1.1 \times 10^{10}$ |
| Fly Ash Attachment | Not attached | Not attached | Not attached | Not attached | Not attached |
| Surface Stickiness | Not observed | Not observed | Not observed | Not observed | Not observed |

We claim:

1. A methacrylic resin composition comprising:
(I) 50 to 99.8% by weight, based on the total weight of the methacrylic resin composition, of a methacrylic resin comprising 80% to 100% by weight of methyl methacrylate units and 20% to 0% by weight of units of another monomer copolymerizable with methyl methacrylate,
(II) 0.1 to 40% by weight, based on the total weight of the methacrylic resin composition, of a rubbery component which is a multi-stage, sequentially produced polymer containing an elastomeric portion comprising at least 50% by weight of units of a monomer selected from the group consisting of 1,3-butadiene and an acrylic acid ester, and
(III) 0.1 to 10% by weight, based on the total weight of the methacrylic resin composition of at least one compound selected from the group consisting of ester compounds of polyhydroxy alcohols and aliphatic acids represented by the following formulae:

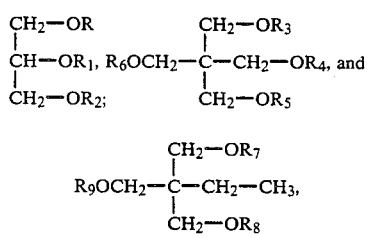

wherein R, $R_1$, $R_2$, $R_3$, $R_4$, $R_5$, $R_6$, $R_7$, $R_8$ and $R_9$ independently represent hydrogen or an acyl group of 8 to 20 carbon atoms, and phosphate compounds represented by the following formulae:

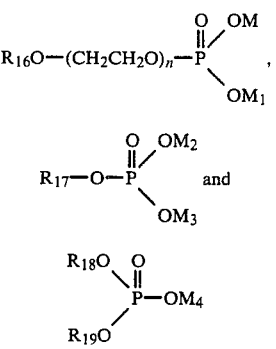

wherein $R_{16}$, $R_{17}$, $R_{18}$, and $R_{19}$ independently represent an alkyl group having 8 to 20 carbon atoms; M, $M_1$, $M_2$, $M_3$, and $M_4$ independently represent hydrogen, Na, K or Li; and n is a number of from 1 to 50.

2. The methacrylic resin composition as set forth in claim 1, wherein the rubbery component (II) is a multi-stage, sequentially produced polymer containing an elastomeric portion comprising at least 50% by weight of units of an alkyl acrylate, the alkyl group being unsubstituted or substituted and having 1 to 8 carbon atoms.

3. The methacrylic resin composition as set forth in claim 1, wherein the rubbery component (II) is a multi-stage, sequentially produced polymer containing an elastomeric portion comprising at least 50% by weight of units of 1,3-butadiene.

4. The methacrylic resin composition as set forth in claim 1, wherein the rubbery component (II) is a multi-stage, sequentially produced polymer which is prepared by two stage polymerization and comprises (i) an elastomer phase formed in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., and (ii) a hard resin phase formed in the second polymerization stage in the presence of the product obtained in the first polymerization stage, comprised of 80 to 100% by weight of units of methyl methacrylate and having a glass transition temperature of at least 25° C.

5. The methacrylic resin composition as set forth in claim 1, wherein the rubbery component (II) is a multistage, sequentially produced polymer which is prepared by three or more stage polymerization and comprises (i) an elastomer phase formed in the first polymerization stage, comprised of units of at least 50% by weight of an alkyl acrylate (the alkyl group being unsubstituted or substituted and having 1 to 8 carbon atoms) and having a glass transition temperature not higher than 25° C., (ii) a hard resin phase formed in the final polymerization stage, comprised of 80 to 100% by weight of units of methyl methacrylate and having a glass transition temperature of at least 25° C., and (iii) one or more intermediate phases formed in the intermediate polymerization stage or stages, each intermediate phase being comprised of units of an alkyl acrylate (the alkyl group being unsubstituted or substituted and having 1 to 8 carbon atoms) and units of methyl methacrylate and having a glass transition temperature between those of the first elastomer phase and the final hard resin phase; each of the intermediate polymerization stage or stages and the final polymerization stage being effected in the presence of the product obtained in the previous polymerization stage.

6. The methacrylic resin composition as set forth in claim 1, wherein the rubbery component (II) is a multistage, sequentially produced polymer which is prepared by three stage polymerization and comprises (i) an elastomer phase formed in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., (ii) a hard resin phase formed in the second polymerization stage in the presence of the product obtained in the first polymerization stage, comprised of 80 to 100% by weight of units of methyl methacrylate and having a glass transition temperature of at least 25° C., and (iii) an elastomer phase formed in the third polymerization stage in the presence of the product obtained in the second polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C.

7. The methacrylic resin composition as set forth in claim 1, wherein the rubbery component (II) is a multistage, sequentially produced polymer which is prepared by three stage polymerization and comprises (i) an elastomer phase formed in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., (ii) a hard resin phase formed in the second polymerization stage in the presence of the product obtained in the first polymerization stage, comprised of 80 to 100% by weight of units of methyl methacrylate and having a glass transition temperature of at least 25° C., (iii) an elastomer phase formed in the third polymerization stage in the presence of the product obtained in the second polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., and (iv) a hard resin phase formed in the fourth polymerization stage in the presence of the product obtained in the third polymerization stage, comprised of 80 to 100% by weight of units of methyl methacrylate and having a glass transition temperature of at least 25° C.

8. The methacrylic resin composition as set forth in claim 1, wherein the rubbery component (II) is a multistage, sequentially produced polymer which is prepared by three stage polymerization and comprises (i) a hard resin phase formed in the first polymerization stage, comprised of 80 to 100% by weight of units of methyl methacrylate and having a glass transition temperature of at least 25° C., (ii) an elastomer phase formed in the second polymerization stage in the presence of the product obtained in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., and (iii) a hard resin phase formed in the third polymerization stage in the presence of the product obtained in the second polymerization stage, comprised of 80 to 100% by weight of units of methyl methacrylate and having a glass transition temperature of at least 25° C.

9. The methacrylic resin composition as set forth in claim 1, wherein the rubbery component (II) is a multistage, sequentially produced polymer which is prepared by five or more stage polymerization and comprises (i) a hard resin phase formed in the first polymerization stage, comprised of 80 to 100% by weight of units of methyl methacrylate and having a glass transition temperature of at least 25° C., (ii) an elastomer phase formed in an intermediate polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., and (iii) a hard resin phase formed in the final polymerization stage, comprised of 80 to 100% by weight of methyl methacrylate and having a glass transition temperature of at least 25° C., (iv) one or more intermediate phases formed in the intermediate polymerization stage or stages between the first polymerization stage and the polymerization stage for the formation of the elastomer phase (ii), each intermediate phase being comprised of units of an alkyl acrylate, the alkyl group being unsubstituted or substituted and having 1 to 8 carbon atoms, and units of methyl methacrylate and having a glass transition temperature between those of the hard resin phase (i) and the elastomer phase (ii), and (v) one or more intermediate phases formed in the intermediate polymerization stage or stages between the polymerization stage for the formation of the elastomer phase (ii) and the final polymerization stage, each intermediate phase being comprised of units of an alkyl acrylate, the alkyl group being unsubstituted or substituted and having 1 to 8 carbon atoms, and units of methyl methacrylate and having a glass transition temperature between those of the elastomer phase (ii) and the hard resin phase (iii);

each of the intermediate polymerization stage or stages between the first polymerization stage and the polymerization stage for the formation of the elastomer phase (ii); the polymerization stage for the formation of the elastomer phase (ii); the intermediate polymerization stage or stages between the polymerization stage for the formation of the elastomer phase (ii) and the final polymerization stage; and the final polymerization stage, being effected in the presence of the product obtained in the previous polymerization stage.

10. The methacrylic resin composition as set forth in claim 1, wherein the rubbery component (II) is a multi-stage, sequentially produced polymer which is prepared by four stage polymerizaton and comprises (i) a hard resin phase formed in the first polymerization stage, comprised of 80 to 100% by weight of units of methyl methacrylate and having a glass transition temperature of at least 25° C., (ii) an elastomer phase formed in the second polymerization stage in the presence of the product obtained in the first polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C., (iii) a hard resin phase formed in the third polymerization stage in the presence of the product obtained in the second polymerization stage, comprised of 80 to 100% by weight of units of methyl methacrylate and having a glass transition temperature of at least 25° C., and (iv) an elastomer phase formed in the fourth polymerization stage in the presence of the product obtained in the third polymerization stage, comprised of at least 50% by weight of units of an alkyl acrylate, the alkyl group being unsubstituted or substituted and having 1 to 8 carbon atoms, and the elastomer phase having a glass transition temperature not higher than 25° C.

11. The methacrylic resin composition as set forth in claim 1, wherein the rubbery component is a graft polymer which is prepared by two stage polymerization and comprises (i) an elastomer phase formed from a monomer mixture comprised of 1 to 95% by weight of 1,3-butadiene, 5 to 99% by weight of an alkyl acrylate, the alkyl group being unsubstituted or substituted and having 1 to 8 carbon atoms, and 0 to 20% by weight of at least one other copolymerizable monofunctional or polyfunctional monomer, and (ii) a hard resin phase formed by polymerizing in the presence of the elastomer phase (i) a monomer or monomer mixture comprised of 80 to 100% by weight of methyl methacrylate and 0 to 20% by weight of at least one other copolymerizable monomer, the amount of the hard resin phase (ii) being 10 to 1000 parts by weight per 100 parts by weight of the elastomer phase (i).

12. A methacrylic resin composition, comorising:
(I) 50 to 99.8% by weight, based on the total weight of the methacrylic resin composition, of a methacrylic resin comprising 80% to 100% by weight of methyl methacrylate units and 20% to 0% by weight of units of another monomer copolymerizable with methyl methacrylate, (II) 0.1 to 40% by weight, based on the total weight of the methacrylic resin composition, of a rubbery component which is a multi-stage, sequentially produced polymer containing an elastomeric portion comprising at least 50% by weight of units of a monomer selected from the group consisting of 1,3-butadiene and an acrylic acid ester, and
(III) 0.1 to 10% by weight, based on the total weight of the methacrylic resin composition of at least one compound selected from the group consisting of ester compounds of polyhydroxy alcohols and aliphatic acids represented by the following formulae:

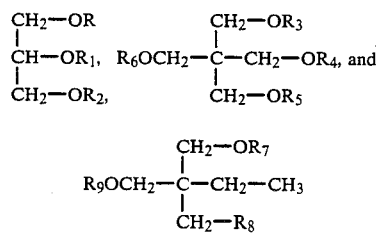

wherein one of R, $R_1$ and $R_2$ is a $C_{8-20}$ acyl group while the remaining grouos are hydrogen, one of $R_3$, $R_4$, $R_5$ and $R_6$ is a $C_{8-20}$ acyl group while the remaining groups are hydrogen, and one of $R_7$, $R_8$ and $R_9$ is a $C_{8-20}$ acyl group while the remaining groups are hydrogen, and phosphate compounds represented by the following formulae:

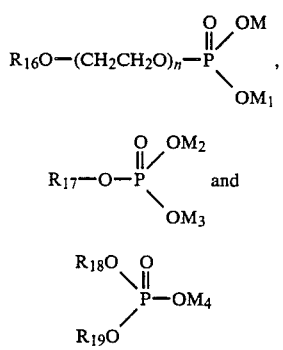

wherein $R_{16}$, $R_{17}$, $R_{18}$, and $R_{19}$ independently represent an alkyl group having 8 to 20 carbon atoms; M, $M_1$, $M_2$, $M_3$, and $M_4$ independently represent hydrogen, Na, K or Li; and n is a number of from 1 to 50.

* * * * *